Figure 1:
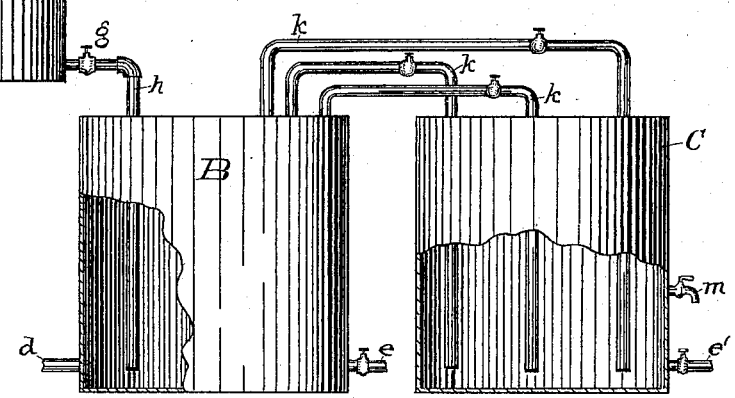

(No Model.)

R. M. PERRINE.
PROCESS OF BLEACHING WAX.

No. 389,898. Patented Sept. 25, 1888.

Witnesses:
L. R. Vorce
C. C. Hinsdale

Inventor:
Robert Milton Perrine
by C. M. Vorce
Atty

UNITED STATES PATENT OFFICE.

ROBERT MILTON PERRINE, OF CLEVELAND, OHIO.

PROCESS OF BLEACHING WAX.

SPECIFICATION forming part of Letters Patent No. 389,898, dated September 25, 1888.

Application filed November 17, 1886. Serial No. 219,193. (No specimens.)

*To all whom it may concern:*

Be it known that I, ROBERT MILTON PERRINE, a citizen of the United States, residing at Cleveland, in the county of Cuyahoga and State of Ohio, have invented certain new and useful Improvements in the Process of Bleaching Wax; and I hereby declare that the following is a full, true, and exact description of the invention, which will enable any person skilled in the art to which it pertains to make and use the same.

The object of my invention is to accomplish the rapid bleaching of wax in large quantities, and is especially applicable to the bleaching of paraffine wax, but may be applied to many other substances, and to all kinds of wax and oil, and to any quantity of material, small or great. I accomplish this object by means of the process hereinafter described and the apparatus shown in the drawings, in which—

Figure 2:
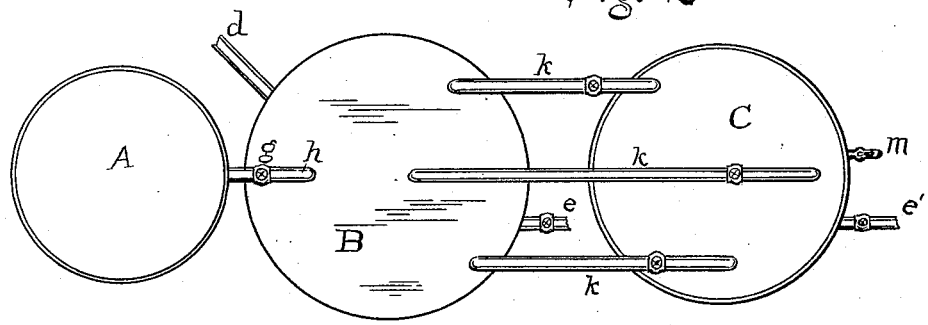

Figure 1 is a side view of the apparatus in elevation; and Fig. 2 is a plan view of the apparatus, viewed from above.

Similar letters refer to similar parts in all the drawings.

A is a tank of suitable capacity for holding the bleaching-solution, and elevated above the rest of the apparatus, so as to enable the bleaching-solution to flow into the steam-tank B by gravity.

B is a closed tank placed below tank A and provided with a steam-inlet pipe, $d$, entering near the bottom and connecting with a steam-generator, and a water-inlet pipe, $e$, also entering near the bottom.

C is an open tank to contain the material to be bleached, and is provided with a water-inlet pipe, $e'$, entering near the bottom, and a draw-off cock, $m$, at any convenient height.

$h$ is a pipe passing from the tank A close to the bottom, or from the bottom itself, entering the tank B at or near the top by a steam-tight joint and passing down to within a few inches of the bottom of B, so as to discharge the bleaching-liquid near the bottom of tank B. The pipe $h$ is provided with a suitable valve, $g$, to regulate the flow of the bleaching-fluid, and all steam and water pipes are provided with suitable cocks and valves to control the passage of steam or water through them.

$k\ k\ k$ are steam-pipes passing from the top of the steam-tank B into the tank C, and extending to near the bottom of the same, and are to be sufficient in number to deliver steam into all parts of the tank C; or a single steam-pipe with branches, or a coil, may be used, the object being to introduce the steam and bleaching-vapor simultaneously through all parts of the wax or other substance to be bleached.

The operation of my apparatus and process is as follows: A bleaching-solution composed of chloride of lime in water in the proportion of five ounces of the dry powder for each pound of crude paraffine wax or other substance to be bleached and water sufficient to dissolve it is placed in the tank A, the valve $g$ being closed. Water, preferably heated to 150° Fahrenheit or over, is pumped into tank B until it is about half filled, or a little less, and water is pumped into tank C until it is filled above the ends of the steam-pipes $k\ k\ k$, or above the outlet of the steam pipes or coil. The crude wax or other substance is then placed in tank C to the quantity of one or more tons, according to the capacity of the apparatus. Steam at a high pressure is then turned on through the pipe $d$, and at first condenses, but soon heats the water in tank B to the boiling-point, when steam passes over by the pipes $k\ k\ k$, and, after raising the water in tank C to the boiling-point, passes up through the melted wax and thoroughly agitates the same. The bleaching-liquid is now turned on by means of the valve $g$, slowly at first and more rapidly toward the last, and, passing down the pipe $h$, is vaporized in tank B and passes over with the steam into tank C and up through the liquid wax in divided jets, at the same time agitating the wax, so that all parts thereof are acted on by the bleaching vapor and steam, whereby in about eight hours the wax is fully bleached, an operation which requires by the usual methods about six days. At the completion of the operation, after the bleaching-liquid has all passed over or the supply is shut off when sufficient is passed through, steam is continued passing for a short time to carry off all the bleaching-vapor, when the steam is shut off and the bleached wax is drawn off through the cock $m$, water being pumped in through the pipe $e'$ to raise the bottom of the wax to the level of the cock m.

I am aware that chlorine vapor obtained by passing steam through or over dry chloride of lime has been used for bleaching by subjecting the articles to be bleached—such as hats, feathers, straw, and fabrics—to the action of such vapor in more or less completely closed chambers in the presence of air, in the same manner as the bleaching-fumes of burning brimstone are used, and that Richard Gaggin obtained Letters Patent of the United States No. 118,359, dated August 22, 1871, for a process of deodorizing hydrocarbon oils by the use of pure dry chlorine gas without heat and with or without air. My process differs from both the above, and has these advantages, viz: By vaporizing a watery solution of chloride of lime a stronger vapor is obtained than is afforded by passing steam through the dry chloride of lime, which but weakly impregnates the steam with chlorine vapor, and I employ heat, which hastens and intensifies the action of the chlorine vapor, and combine with it the bleaching power of steam, which is itself a bleaching agent of considerable power, and avoid the presence of atmospheric air, which, when present, dilutes the bleaching-vapor, and consequently prolongs the time required for its action.

I make no claim in this application to the apparatus above described, the same being reserved for a separate application, hereafter to be filed as a division of this application.

What I claim as my invention is—

1. The above-described process of bleaching wax and similar substances by agitating the same while heated by means of a hot vapor of chloride of lime mixed with steam forced through the heated mass in divided jets, and finally passing pure steam through said heated mass, substantially as described.

2. The above-described process of bleaching wax and similar substances, the same consisting in heating the wax to a liquid condition, then passing a combined vapor of bleaching-solution of steam and gases, resulting from the decomposed chloride of lime, in divided jets through the wax, and finally passing pure steam through the body of wax to cleanse the same and remove the bleaching-solution, substantially as set forth.

ROBERT MILTON PERRINE.

Witnesses:
G. F. SHALER,
L. PRENTISS.